Patented Mar. 16, 1943

2,314,242

UNITED STATES PATENT OFFICE 2,314,242

PREPARATION OF EMULSIONS FOR WATER-PROOFING AND FIREPROOFING PURPOSES

Rotheus B. Porter, Jr., Malden, Mass., assignor to Herbert B. Morse, Wellesley Hills, Mass.

No Drawing. Application May 22, 1940, Serial No. 336,602

4 Claims. (Cl. 106—15)

This invention relates to the preparation of emulsions for waterproofing and fireproofing purposes. It deals more especially with a normally fluent so-called invert emulsion containing a liquid organic solvent solution of thermoplastic hydrocarbon, such as asphalt, as the continuous phase; an aqueous medium as the disperse or emulsified phase; and a so-called water-in-oil dispersing agent, as the stabilizer for the invert emulsion.

In accordance with the present invention, there is produced an invert asphalt or other thermoplastic hydrocarbon emulsion intended for use as an impregnant for various absorptive or fibrous bases, including cotton cloth, braiding, and other combustible materials composed of, say, cotton fiber, wood pulp, or the like. Not only does the emulsion hereof comprise asphalt dissolved in a suitable organic solvent medium, such as petroleum hydrocarbon, as the continuous phase, and water in subordinate amount, as the disperse or emulsified phase, but the disperse water phase contains dissolved therein a suitable fireproofing agent or salt, say, a sulphate, phosphate, or tungstate, in amount sufficient to render fire-resistant or fireproof the dried or set solids content of the emulsion. By reason of the fact that the asphalt solution constitutes the continuous phase of the emulsion, it is possible to realize the desired substantially uniform impregnation of various bodies or bases with such emulsions, whereas, when an asphalt-in-water type of emulsion is employed, there may be marked tendency for asphalt particles beyond a particular size to filter out and clog the surface pores, in consequence of which the impregnated product may be much poorer in asphalt content in its interior than on its surface. Again, because the emulsion hereof carries as its disperse or discontinuous phase a substantial amount of water containing a substantial amount of fireproofing agent dissolved therein, it is possible to realize a fireproof or highly fire-resistant quality in bodies or bases impregnated with the emulsion, since, as the continuous asphaltic solution phase enters into the pores and interstices of the body being impregnated, it carries therewith the microscopically fine or dispersed water particles each containing a charge of dissolved fireproofing agent, wherefore, when the impregnated body is dried, such agent remains as a fireproofing residue distributed throughout the body. The resulting product is thus substantially uniformly impregnated and exhibits the desired fire-resistant as well as water-resistant quality.

In preparing the invert emulsion of the present invention, the practice may be to admix in a suitable homogenizing, mixing, or emulsifying machine an aqueous solution of the fireproofing agent or salt with an organic solvent solution of the asphalt heated to suitable temperature and containing as an addition thereto a suitable water-in-oil dispersing agent. The asphalt employed for the purpose hereof may have a melting point ranging from, say, about 110° to about 220° F. Thus, a typical asphalt may be one prepared by compounding equal proportions of a low-grade blown asphalt having a melting point of, say, about 120° F. with a so-called Mexican asphalt having a melting point of, say, about 100° to 110° F. The asphalt or asphaltic compound may be melted or heated to a temperature somewhat higher than its melting point, whereupon there may be compounded therewith a suitable water-in-oil dispersing agent, preferably so-called degras or wool grease. To the melted mixture may then be added a normally liquid, volatilizable organic solvent for the asphalt, typically, a hydrocarbon solvent having a boiling point of about 300° F. or equivalent organic solvent preferably having a boiling point distinctly higher than the melting point of the asphaltic compound. To the solution of asphaltic compound containing the degras may then be added an aqueous solution of a water-soluble fireproofing salt in such restricted or subordinate amount as to constitute the aqueous medium the disperse or discontinuous phase of the resulting emulsion.

If desired, one or more secondary or auxiliary dispersing agents may be added to the resulting emulsion or to the materials used in its preparation, for instance, such higher aliphatic alcohols as butyl and propyl alcohols. Indeed, any of the aliphatic or fatty alcohols up to octyl alcohol may be employed as the secondary or auxiliary dispersing agents. Alcohols higher than octyl alcohol are unsuitable for the purposes hereof by reason of their substantially complete water-insolubility. Again, a small amount of alkaline reagent, such as ammonia or caustic alkali, may be added to the emulsion to put it on the alkaline side and thus to increase its stability. When such fatty-acid-glyceride-containing dispersing agent as degras is used in the preparation of the emulsion hereof, the ammonia or other alkali may be used in such amount as not only to put the emulsion on the alkaline side but also to react with part of such agent to form a soap, which also enhances the stability of the emulsion.

An invert asphalt emulsion constituting an embodiment of the invention may be composed essentially of the following ingredients:

| | Parts |
|---|---|
| Asphalt (melting point 120° F.) | 26.7 |
| Asphalt (melting point 100° F.) | 26.7 |
| Petroleum hydrocarbon (boiling point 300° F.) | 30.0 |
| Degras | 2.9 |
| Butyl alcohol | 1.0 |
| Ammonium sulphate | 2.9 to 5.4 |
| Water | 7.9 |
| 26° Baumé ammonia water | 1.9 |

The foregoing composition is simply illustrative of one especially adapted for rendering water-resistant and fire-resistant an insulating wrapping, jacket, or conduit for electro-conducting cables, say, a wrapping or conduit comprising cotton, cotton and asbestos fiber, paper, etc.; also for impregnating fire-hose fabric, roofing felts or fabrics, and the like.

The foregoing exemplary composition is subject to considerable variation while falling within the purview of the present invention. Thus, the organic solvent medium for the asphalt may be one of a large variety of liquid hydrocarbons or chlorinated hydrocarbons, preferably one whose boiling point is sufficiently above the melting point of the asphalt to avoid flashing into vapor when such solvent is added to the molten asphalt or asphaltic compound. Among such hydrocarbons and chlorinated hydrocarbons may be mentioned not only hydrocarbons of the nature of kerosene but such others as toluol, xylol, and carbon tetrachloride. In lieu of the degras as the water-in-oil dispersing agent, it is possible to use the oil-soluble soaps, such as magnesium oleate, calcium oleate, calcium stearate, palmitate, and such other fatty acid soaps of the alkaline earth metals as are characterized by their water-insolubility but water-holding or water-absorbing property. Lanolin, which represents a refined form of wool grease, may also be employed as the water-in-oil dispersing agent. Indeed, the expression "water-in-oil dispersing agent," as used herein, is meant to apply to such various dispersing agents as are well known to those skilled in the art as being suitable for emulsifying or dispersing water in oil, for such dispersing agents as a class have also been found to be suitable for use in preparing the compositions hereof.

Such various water-soluble fireproofing salts as are useful in the composition hereof include generally the borates, phosphates, chlorides, silicates, tungstates, etc.; and the ammonium salts, as well as the alkali-metal salts, are especially effective. Depending upon the solubility of the particular salt to be employed and upon the particular amount of salt to be carried by the composition hereof, the water content of such composition is subject to considerable variation while still being maintained as the disperse phase of the composition. Thus, the water content of the composition may range from, say, about 5% to 40% of the weight of the composition; and such water content may contain dissolved therein various amounts of the indicated fireprofing agents, depending upon the fire-resistant or fireproof quality to be imparted to the dried solids content of the composition and/or to the product to be impregnated therewith. In general, the composition hereof may be characterized as comprising a preponderant proportion of an organic solvent solution of thermoplastic hydrocarbon as the continuous phase, a subordinate proportion of water as the disperse phase, and a relatively small amount of dispersion-stabilizer or water-emulsifying agent.

In lieu of asphalt or asphalt dissolved in a liquid organic solvent, one may use in the compositions hereof such other thermoplastic hydrocarbons as paraffin wax, amorphous wax, etc. A composition hereof containing a relatively colorless hydrocarbon, such as paraffin wax, may be desirable more particularly for such purposes as waterproofing and fireproofing tent and awning cloths, canvases, cloths for wagon tops, sails, etc. When a cloth or other fibrous base is impregnated or coated with the composition hereof, the impregnated or coated cloth or other base may be dried at sufficiently elevated temperature not only to evaporate the aqueous phase but also very largely to volatilize the liquid organic solvent initially used in dissolving or rendering fluent at normal temperature the asphalt, paraffin wax, or other thermoplastic hydrocarbon employed. In this latter connection, it might be noted that while the amount of organic liquid solvent used in the composition hereof is subject to considerable variation, yet, in any event, sufficient of such solvent, such as petroleum hydrocarbon, is employed so as to render the composition hereof readily fluent or liquid at room temperature, say, 18° C. Indeed, one of the important advantages of the composition hereof is its fluency and high penetrability at room temperature, which properties enable the use of the composition at room temperature in impregnating various cloths and other fibrous bases in continuous or sheet form to produce at high speed substantially uniformly impregnated products.

Various other changes or modifications are possible in the composition hereof and in its mode of preparation without departing from the inventive principles and teachings hereof as defined by the appended claims.

I claim:

1. A normally liquid emulsified composition of matter comprising a preponderant proportion of an organic solvent solution of thermoplastic hydrocarbon as the continuous phase, a subordinate proportion of water as the disperse phase, and a relatively small amount of degras as dispersion-stabilizer, said disperse water phase containing dissolved therein a water-soluble fireproofing salt in amount sufficient to render said composition fire-resistant when dried.

2. A normally liquid emulsified composition of matter comprising a preponderant proportion of an organic solvent solution of asphalt as the continuous phase, a subordinate proportion of water as the disperse phase, and a relatively small amount of degras as dispersion-stabilizer, said disperse water phase containing dissolved therein a water-soluble fireproofing salt in amount sufficient to render said composition fire-resistant when dried.

3. A normally liquid emulsified composition of matter comprising a preponderant proportion of an organic solvent solution of thermoplastic hydrocarbon as the continuous phase, a subordinate proportion of water as the disperse phase, and a relatively small amount of partially saponified degras as dispersion-stabilizer, said disperse water phase containing dissolved therein a water-soluble fireproofing salt in amount sufficient to render said composition fire-resistant when dried and said composition being on the alkaline side.

4. A normally liquid emulsified composition of matter comprising as the continuous phase a preponderant proportion of an organic solvent solution of thermoplastic hydrocarbon, as the disperse phase a subordinate proportion of water, and as the dispersing agent a relatively small amount of degras and an alcohol selected from a group of aliphatic alcohols ranging from butyl alcohol to octyl alcohol, said disperse water phase containing dissolved therein a water-soluble fireproofing salt in amount sufficient to render said composition fire-resistant when dried.

ROTHEUS B. PORTER, JR.